United States Patent [19]

Bodlaj et al.

[11] Patent Number: 4,663,767
[45] Date of Patent: May 5, 1987

[54] OPTICAL DATA BUS HAVING A STATISTICAL ACCESS METHOD

[75] Inventors: Viktor Bodlaj; Steven Moustakas; Hans-Hermann Witte, all of Munich, Fed. Rep. of Germany

[73] Assignee: Siemens Aktiengesellschaft, Berlin and Munich, Fed. Rep. of Germany

[21] Appl. No.: 748,842

[22] Filed: Jun. 26, 1985

[30] Foreign Application Priority Data

Jul. 19, 1984 [DE] Fed. Rep. of Germany ....... 3426683

[51] Int. Cl.⁴ .............................................. H04L 27/00
[52] U.S. Cl. ...................................... 375/55; 455/608; 360/44
[58] Field of Search ............................. 375/55, 87, 94; 340/347 DD; 455/608, 617, 619; 360/40, 44

[56] References Cited

U.S. PATENT DOCUMENTS

| 3,980,825 | 9/1976 | Morrien | 375/55 |
|---|---|---|---|
| 4,257,125 | 3/1981 | Theall, Jr. | 375/55 |
| 4,276,656 | 6/1981 | Petryk, Jr. | 455/608 |
| 4,491,942 | 1/1985 | Witle et al. | |
| 4,562,582 | 12/1985 | Tokura et al. | 375/55 |

OTHER PUBLICATIONS

Yount, "Manchester Detector Optimizes Fiber-Optic Receiver", Electronics, Jun. 16, 1982, p. 159.
Texas Instruments "Data Book", p. 209, p. 76 (with respect to the modules SN 74586 & SN 74 SN 74).
Metcalfe et al. "Ethernet: Distributed Packet Switching for Local Computer Networks", Comm. of the ACM, Jul. 1976, vol. 19, No. 7 pp. 395–404.

Primary Examiner—Robert L. Griffin
Assistant Examiner—Stephen Chin
Attorney, Agent, or Firm—Hill, Van Santen, Steadman & Simpson

[57] ABSTRACT

An optical data bus with a statistical access method for the transmission of data between transmitters and receivers in the form of NRZ data provides that every transmitter of a subscriber contains a Manchester encoder which Manchester encodes the NRZ data and deposits such data onto the bus in a Manchester-encoded form. The receiver of every subscriber contains a Manchester decoder for the reacquisition of the NRZ data from the Manchester encoded data and contains a clock recovery device which recovers the clock contained in the Manchester-encoded data. Such a Manchester decoder with the clock recovery device can be constructed in a very simple manner and such a simple structure is disclosed. A very simply-constructed bus state recognition device is also included.

6 Claims, 5 Drawing Figures

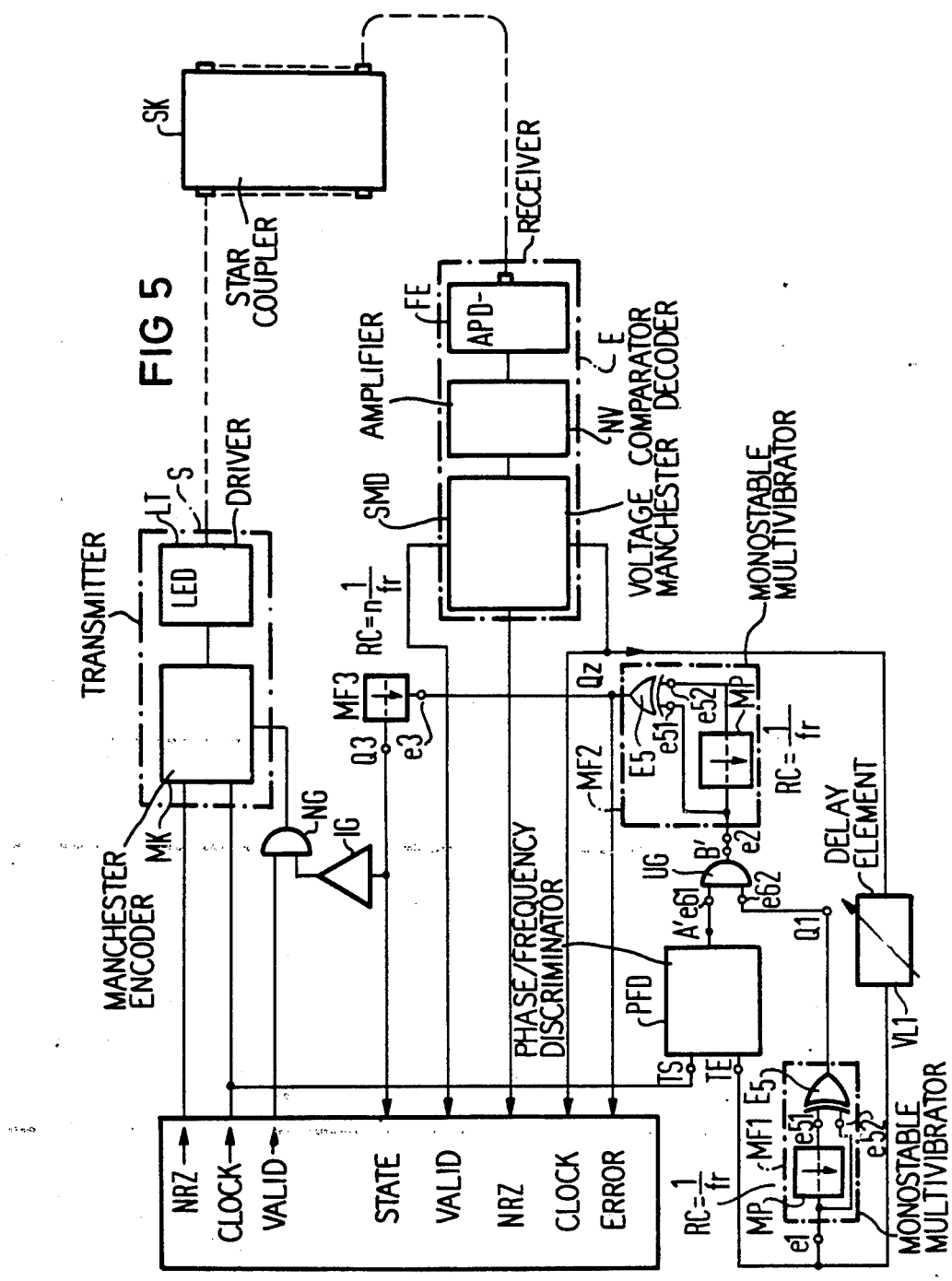

OPTICAL DATA BUS HAVING A STATISTICAL ACCESS METHOD

BACKGROUND OF THE INVENTION

1. Field of the Invention

The present invention relates to an optical data bus, in particular having a statistical access method, for the transmission of data between transmitters and receivers in the form of clock signals, particularly non-return to zero (NRZ) data, whereby every transmitter has an encoder assigned thereto which encodes the signals to be output from the transmitter onto the data bus in a specific manner and whereby every receiver is preseated by a decoder for decoding the data supplied from the data bus to the receiver and for reacquisition of the clock contained in the encoded data.

2. Description of the Prior Art

A data bus of the type generally set forth above has been proposed by Witte et al in their U.S. Pat. No. 4,491,942, issued Jan. 1, 1985, fully incorporated herein by this reference. A specific example of a statistical or asynchronous access method is the CSMA/CD access method as reported in "Carrier Sense Multiple Access Collision Detection", v. Comm. of the ACM, July 1976, Vol. 19, No. 7, pp. 395–404.

In the proposed data bus, the bit rate on the transmission link is equal to the data bit rate to be transmitted. The encoder assigned to the transmitter is composed of a scrambler which (a) is required for recovering the clock in the receiver and (b) is required for the logical discrimination of the state "do not transmit data" from the state "transmit data". The decoder is composed of an unscrambler. The start of the useful data is to be preceded by so-called header bits and the end of the useful data is marked by end of data mark bits in the form of a defined bit sequence. The clock is recovered, for example by a phase locked loop (PLL) circuit from the bit sequence incoming to a receiver. The receiver controlled is constructed such that the correct clock is reacquired after the header bit sequence and the end of data mark bits and the header bits are separated from the actual useful data.

SUMMARY OF THE INVENTION

In an optical data bus of the above species, the object of the present invention is to obtain, particularly with CSMA/CD access methods, the most simple as possible control circuits for the communication portion.

The above object is achieved, according to the present invention, in the type of system generally set forth above which is characterized in that the encoder is a Manchester encoder which effects Manchester encoding of the data to be output onto the data bus, in that the decoder is composed of a Manchester decoder which decodes the Manchester encoded data supplied thereto, and in that a clock recovery device is provided which reacquires the clock contained in the Manchester-encoded data from the Manchester-encoded data and the decoded data.

The above solution, accordingly, is based on the known principle of encoding the useful data in accordance with the Manchester techniques in order to reacquire the clock in the receiver in a simple manner.

This type of decoding enables the control circuits in the transmitter portion, in the receiver portion and in the collision recognition portion to be simplified and constructed with fewer modules. Further, no marks are required for the beginning and the end of the useful data, these marks having to be separated again from the useful data in the receiver. The data bus of the present invention requires twice as much bandwidth as the aforementioned proposed data bus. Its structure, however, is more simple and is therefore less susceptible to disruption. It can be advantageously realized everywhere that an optical transmission system comprising transmitters, fibers and receivers still contains sufficient reserve that the system can be operated 100% redundancy.

A particularly simple and advantageous embodiment of the data bus of the present invention is characterized in that the Manchester decoder comprises three delay lines in which the supplied Manchester-encoded data are respectively delayed by half the clock duration, by a duration lying between half the clock duration and the full clock duration, and by the full clock duration of the clock contained in the supply data. The data delayed by the full clock duration and the data delayed by the duration lying between half the clock duration and the full clock duration are combined by an EXCLUSIVE OR gate whose output signal is supplied to the clock input of a D flip-flop. The supplied, undelayed Manchester-encoded data and the Manchester-encoded data delayed by half the clock are combined by a second EXCLUSIVE OR gate whose output signal is inverted and is supplied to the D input of one D flip-flop. The one D flip-flop is followed by a further D flip-flop to whose clock input the output signal at the Q output of the one flip-flop is supplied, at whose D input the supplied Manchester-encoded data is applied undelayed and at whose $\overline{Q}$ output the reacquired NRZ data can be taken. Therefore, the Manchester decoder requires only two D-flip-flops, two EXCLUSIVE OR gates, three delay lines and an inverter.

According to a preferred embodiment of the data bus of the present invention, with a decoder as specified above, is characterized in that the output of the further EXCLUSIVE OR gate is also connected by way of the inverter to the clear input of the one D flip-flop and the PRESET input of both D flip-flops and the clear input of the second D flip-flop are set to a high, constant voltage level.

The NRZ data reacquired by the Manchester decoder in a data bus constructed in accordance with the present invention and characterized as set forth above are somewhat phase-shifted in comparison to the clock contained in the supply data. For the elimination of this phase shift, it is advantageous to construct the data bus such that the $\overline{Q}$ output of the second flip-flop is followed by a delay element which effects a delay by the difference between the full clock and the duration line between half the clock duration and the full clock duration and at whose output the NRZ data may be taken in the phase of the clock with which the supplied data are clocked.

The just-mentioned embodiment also has the advantage that the clock recovery device can be realized by only one additional EXCLUSIVE OR gate which combines the NRZ data from the delay element and the Manchester encoded data delayed by half the clock length with one another and at whose output the clock contained in the supply data can be taken.

By means of the clock recovery device, particularly as set forth immediately above, the valid signal can also be reacquired in a very simple manner with a monostable multivibrator in that the output of the last-mentioned EXCLUSIVE or gate is additionally connected to an input of the monostable multivibrator whose output signal changes from one state into the other with the beginning of a clock at its input and changes back to the other state at the end of the supply clock.

Given a data bus constructed in accordance with the present invention, a bus state recognition device can also be realized in a very simple manner. The data bus is then characterized in that every pair of mutually-assigned transmitters and receivers has a respective bus state recognition device assigned thereto which comprises a phase/frequency discriminator which is charged at one input with the transmission clock with which the data transmitted by the assigned transmitter are clocked and is charged at a second input with the receiver clock which is reacquired by the clock recovery device in the assigned receiver and is delayed by a delay element such that its phase coincides with the phase of the transmission clock when the clock recovery device in the receiver reacquires its own transmission clock in the assigned transmitter. The output signal of the phase/frequency discriminator is zero when the transmitter and receiver clocks coincide exactly both in terms of frequency and phase. The output signal of the phase/frequency discriminator is a pulse sequence whose pulse length is a function of the frequency difference and phase difference between the transmitter clock and the receiver clock. A first monostable multivibrator is provided at whose input the delayed receiver clock is supplied and whose output signal changes from a logical "0" to a logical "1" with the beginning of a supplied receiver clock and changes back to a logical "0" with the end of the receiver clock. The output signal of the first monostable multivibrator and the output signal of the phase/frequency discriminator are combined with one another by an AND gate whose output is supplied to a second monostable multivibrator whose output signal, in turn, changes from a logical "0" to a logical "1" with the beginning of a supply pulse sequence from the AND gate and changes back to a logical "0" from a logical "1" with the end of the pulse sequence and which is used for the bus state recognition.

Advantageously, the output signal at the output of the second monostable multivibrator is supplied to a leading edge-controlled monostable multivibrator having a fixed time constant equal to one or more clock intervals of the transmission clock and whose output signal is used as a bus state recognition signal.

Also advantageously, the output signal of the second monostable multivibrator is simultaneously used as an error recognition signal which indicates an error when it is shorter then the time constant of the third monostable multivibrator.

Also advantageously, the output signal of the third monostable multivibrator is supplied by way of an inverter to an input of a NAND gate whose other input is supplied with a valid signal to be supplied to the assigned transmitter and whose output signal is supplied to the Manchester decoder of this transmitter as a valid signal.

Further, and most advantageously, a monostable multivibrator whose input is charged with a pulse sequence and whose output changes from one state into another with the beginning of the pulse sequence and changes back into the one state with the end of the pulse sequence is composed of and EXCLUSIVE OR gate having two inputs of which one is directly connected to the input of the monostable multivibrator. This input is further connected via a monoflop to the other input of the EXCLUSIVE OR gate whose fixed time constant is selected such that, during the duration of the pulse sequence, levels always differing from one another are applied to the inputs of the EXCLUSIVE OR gate whose output forms the output of the monostable multivibrator.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 5 is a schematic representation of an optical star bus comprising a bus of FIG. 1 and a bus state controller circuit with which an identification can be made whether the bus is free or occupied or whether a data collision occurs.

DESCRIPTION OF THE PREFERRED EMBODIMENTS

Figure 1:
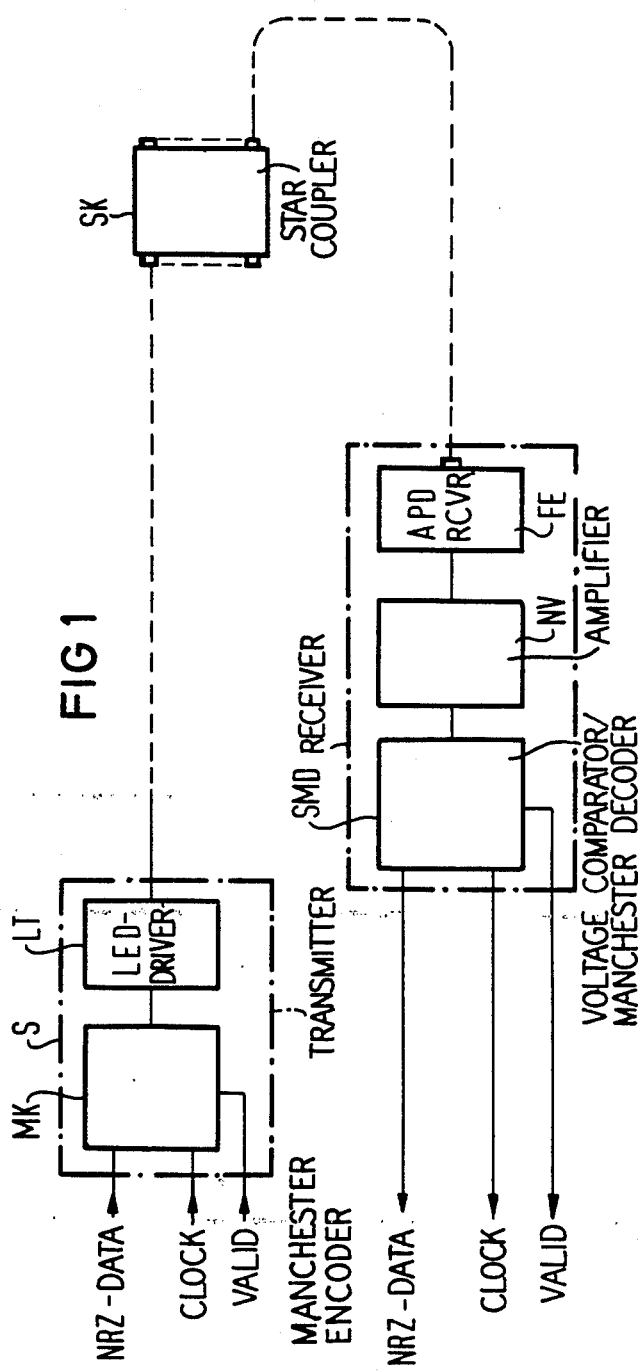
FIG. 1 is a block diagram representation showing the fundamental structure of the transmission of Manchester-encoded data via optical star buses or networks.

The circuit structure of FIG. 1 is composed of a plurality of transmitters S, of which only one is shown, or a star coupler SK, and of a plurality of receivers E, again only one being shown. The transmitter S contains a Manchester encoder MK and a following light-emitting diode (LED) driver LT which drives a light-emitting diode, for example a laser diode. The clock and the NRZ data are supplied to the Manchester encoder MK from which it generates the Manchester-encoded data which is supplied to the light-emitting diode drive LT. The Manchester encoding can be obtained from the clock and the NRZ data with the assistance of, for example, an exclusive OR gate, hereinafter referred to as an EXOR gate.

Figure 2:
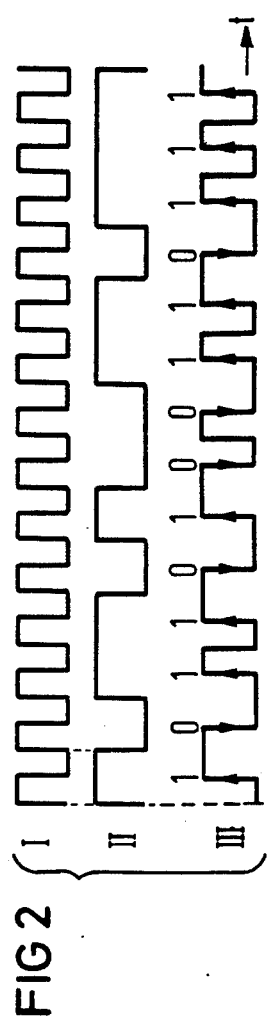
FIG. 2 is a pulse diagram with respect to time t which shows clock pulses at line I, NRZ data in the form of an arbitrarily-selected NRZ encoded bit sequence clocked with these clock pulses at the line II and the same Manchester-encoded bit sequence at the line III which is generated by the Manchester encoder in FIG. 1 from the NRZ data, whereby the bit sequence between the line II and the line III is shown as a "0"-"1" sequence.

The cycle of the Manchester encoding is illustrated by way of example in FIG. 2.

The Manchester-encoded data supplied to the driver LT are supplied via an optical fiber to the star coupler SK. These data are supplied to the receivers from the star coupler SK via other fibers, the fiber connections being illustrated by broken lines. The Manchester-encoded message is received in every receiver E by a photoreceiver FE. A PIN or APD diode can be employed as the photoreceiver FE. The Manchester-encoded signal generated by the photodiode receiver FE is supplied to a photo-diode amplifier (not shown) provided in the photo-diode receiver and this photodiode amplifier can, given Manchester encoding of the data, be an a.c.-coupled amplifier having relatively low bandwidth. The low bandwidth of the photo-diode amplifier produces a good signal-to-noise ratio, this being of great advantage for weak photo-diode signals. The signals preamplified in the photo-diode receiver FE are supplied to a booster amplifier NV in order to amplify the same to a level which is required for the conversion into transistor-to-transistor logic (TTL) signals with the assistance of a voltage comparator contained in a voltage comparator/Manchester decoder SMD provided in the receiver for the reacquisition of the NRZ data, the clock and the valid signal.

The signals converted to the TTL level are decoded in the Manchester decoder MD of the comparator/Manchester decoder SMD. The voltage comparator/Manchester decoder SMD is constructed such that not only the NRZ data are reacquired, but so is the clock that is required for processing the data.

Figure 3:
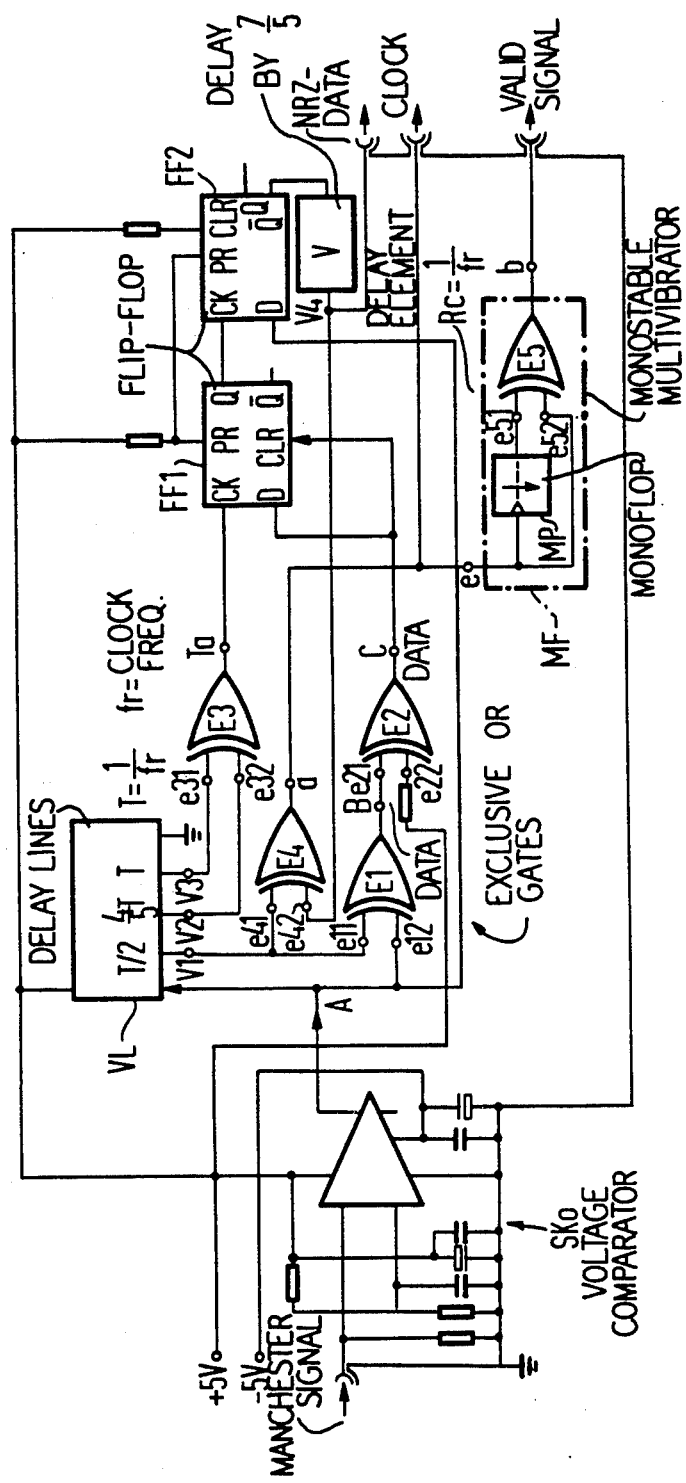
FIG. 3 is a logic circuit diagram of the structure of a voltage comparator/Manchester decoder of the type illustrated in FIG. 1 for the re-acquisition of the NRZ data, of the clock and of the valid signal from the Manchester decoder of FIG. 1.

The structure of such a voltage comparator/Manchester decoder SMD is illustrated in FIG. 3 and shall be described in greater detail below.

The Manchester-decoded data from the booster amplifier NV of the receiver E are supplied to the voltage comparator SKo of the voltage comparator/Manchester decoder SMD whose structure need not be described in greater detail and at whose output 8 the Manchester-encoded data in the form of TTL signals are supplied to the Manchester decoder MD by way of its input A.

Serving for the reacquisition of the NRZ data from the supply, Manchester-encoded data are a plurality of delay lines VL which delay the signals of the Manchester-encoded data by T/2, 4T/5 and T, whereby T denotes the clock length of the clock, as well as the EXOR gates E1-E3 and the two D flip-flops FF1 and FF2. The Manchester-encoded data delayed by 4T/5 and T from the outputs V2 and V3 of the delay lines VL are supplied in parallel to the two inputs e31, e32 of the EXOR gate 3 whose output signal at its output Ta is supplied as a clock to the flip-flop FF1 at its clock input CK. The undelayed Manchester encoded data and the Manchester-encoded data delayed by the interval T/2 from the input A or, respectively, from the output V1 of the delay lines VL are supplied in parallel to the two inputs e11, e12 or the EXOR gate E1 whose output signals from its output B are supplied as data to an input e21 of the EXOR gate 2. The other input e22 of the EXOR gate 2 is connected to a constant high level which is derived from the TTL level of ±5 volts. The EXOR gate E2 thereby functions as an inverter. The output signals from the output C of the EXOR gate E2 are supplied to the D flip-flop FF1 at its D input and its CLR input. The output signal from the Q output of the flip-flop FF1 is supplied as a clock to the clock input CK of the following D flip-flop FF2. The undelayed Manchester encoded data are supplied to the D flip-flop FF2 at its D input and the output signals at the $\overline{Q}$ output of the flip-flop FF2 correspond to the NRZ data which, however, are phase-shifted by the interval T/5 in comparison to the Manchester-encoded data at the input A and, therefore, in comparison to the clock having the frequency $f_T = 1/T$. This phase shift can be eliminated by a delay of an interval T/5 in a delay element V which is required for the recovery of the clock of the valid signal bounding the respective data packet. The two D flip-flops FF1 and FF2 essentially have the job of regenerating the data in the rhythm of the clock. They are correspondingly connected and clock and data signals are correspondingly supplied thereto.

The EXOR gates E1-E3 may be realized, for example, as the module SN 74 S 86 and the D flip-flops may be realized from the module SN 74 S 74, both manufactured by Texas Instruments, Inc. (see their TTL Data Book, Page 209 or, respectively, Page 76, the inputs and outputs of the flip-flop are referenced as on Page 76).

The manner of operation of the voltage comparator/Manchester decoder SMD in FIG. 3 for the reacquisition of the NRZ data shall be explained in greater detail with reference to the pulse diagram of FIG. 4. Shown in this diagram under one another over the time t are pulse trains such as successively exist at the input A, the output V1 of the delay lines VL, at the output B of the EXOR gate E1, at the output C of the EXOR gate E2, at the output B2 of the delay lines VL, at the output V3 of the delay lines VL, at the output Ta of the EXOR gate E3, at the Q output of the D flip-flop FF2, in reoccurrence at the input A, at the Q output of the D flip-flop FF2 and at the $\overline{Q}$ output of the D flip-flop FF2. The following four pulse trains relate to different circuit portions that shall be referred to below.

It is assumed, for example, that the pulse sequence III of FIG. 2 is applied to the input A, this pulse sequence III representing the bit sequence indicated there in Manchester-encoded form. The pulse sequence delayed by the interval T/2 at the output V1 and the pulse sequence at the input A are combined by the EXOR gate E1, whereby the pulse sequence at the output B occurs, this pulse sequence being inverted by the EXOR gate E2, whereby the pulse sequence at the output C occurs. This pulse sequence at the output C which carries the data information is supplied to the D input of the D flip-flop FF1 and is simultaneously supplied to the clear input CLR of the flip-flop FF1.

The pulse sequence at the output V2 delayed by the interval 4T/5 in comparison to the pulse sequence at the input A, and the pulse sequence at the output V3, delayed by the full clock length T, are combined by the EXOR gate E3, whereby the pulse sequence at its output Ta occurs, this pulse sequence being supplied as a clock pulse sequence to the clock input CK of the first D flip-flop FF1. Due to its property as a D flip-flop, this first flip-flop FF1 switches such that the pulse sequence which is illustrated in FIG. 4 at the output Q of the flip-flop FF1 occurs at its output Q. Successive pulses of this pulse sequence at the output Q of the flip-flop FF1 have a spacing from one another which is equal to the pulse or clock duration T or to a whole multiple thereof and the chronologically mark the leading and trailing edges of the appertaining pulses of the original NRZ data.

The pulse sequence at the output Q of the flip-flop FF1 is applied to the clock input CK of the following D flip-flop FF2 at whose D input the Manchester-encoded data at the input A are applied undelayed. Due to its D property, the following flip-flop FF2 switches such that the original NRZ data appear at its output $\overline{Q}$ (see diagram II in FIG. 2). The pulse sequence at the output $\overline{Q}$ of the flip-flop FF2 in FIG. 4 is phase-shifted by the interval 1/5T in comparison to the pulse sequence of the original NRZ data, namely in the sense of a lead. This can be compensated by the delay element V from whose output V4 the original NRZ data are taken in the phase of the clock, these being shown in FIG. 4 at the line V4 and exactly corresponding to the pulse sequence of the line II in FIG. 2.

The reacquired NRZ data from the output V4 are also employed for recovery of the original clock and a clock recovery circuit device which is composed of a delay line for delaying a signal by half a clock length D/2 and of an EXOR gate E4 which can again be realized with the aforementioned module SN 74 S 86.

A delay by the interval T/2 is already present in the delay line VL and they can therefore be employed. The Manchester-encoded data input at the input A and delayed by the interval T/2 are supplied to one input e41 of the EXOR gate E4, whereas the NRZ data taken from the output V4 of the delay element V are supplied undelayed to the other input e42 of the EXOR gate E4. In FIG. 4, these are the pulse sequences at the line V1 and V4, respectively. The clock pulse sequence of the original clock is then directly output at the output a of the EXOR gate E4, this clock pulse sequence being illustrated in the line a of FIG. 4.

Figure 4:
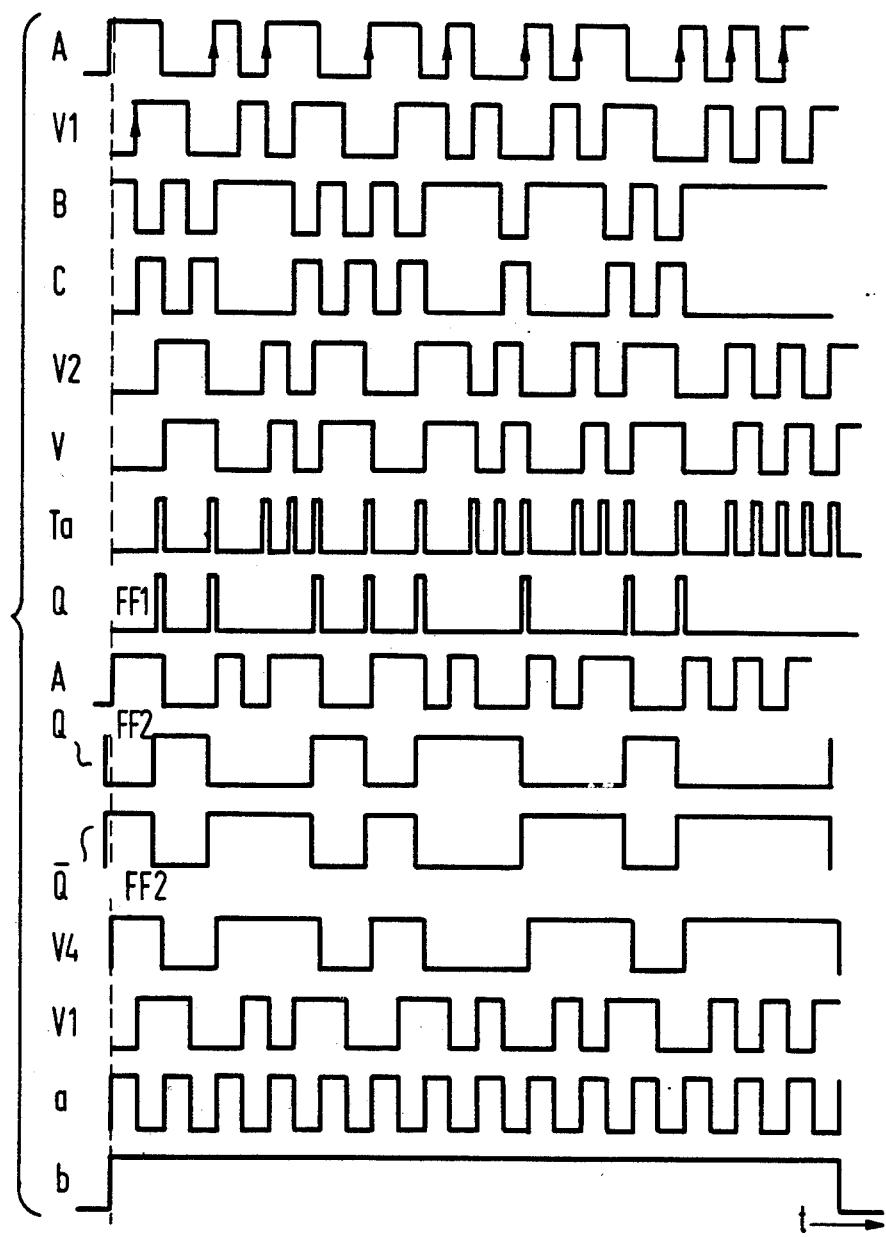
FIG. 4 is a pulse diagram which illustrates the input and output signals at variously-referenced inputs and outputs in FIG. 3 insofar as they are required for an understanding of the manner of operation of the voltage comparator/decoder.

The valid signal shown at the line b in FIG. 4 is obtained from the clock pulses at the output a of the EXOR gate E4 by a monostable multivibrator MF. This monostable multivibrator MF is triggered by the clock pulses from the output a and its time constant is defined by the duration of the pulse sequence, whereby the output signal of the monostable multivibrator MF corresponds to the valid signal. The specific structure of the monostable multivibrator MF shall be described below in conjunction with similar multivibrators.

With the circuit of FIG. 3, consequently, not only the NRZ data can be reacquired, but also the clock and the valid signal which are required for processing the data. Every subscriber who participates in the optical star bus with the star coupler SK comprises a receiver E and a transmitter S with the appertaining Manchester encoder, Manchester decoder and amplifier. It is extremely important for non-disrupted communication of the subscribers and the optical star bus that the bus states be apparent to every subscriber. The following states must therefore be recognizable:
(a) bus is free;
(b) bus is occupied; and
(c) data collision is occurring in the bus.

The reacquired clock whose duration coincides exactly with the duration of the data packets which is defined by the valid signal enables a relatively simple bus state recognition. The schematic structure of a corresponding bus state recognition circuit is illustrated in FIG. 5. The circuit is incorporated in the star bus of FIG. 1.

The primary feature for the bus state recognition is a phase/frequency discriminator PFD to which, on the one hand, the transmission clock supplied to a transmitter S with which the transmitted data are clocked and which, for example, is generated by a computer and, on the other hand, a receiver clock are supplied, this receiver clock being generated or reacquired by the voltage comparator/Manchester decoder SMD in the assigned receiver. The transmission clock generated by the computer is supplied to the phase/frequency discriminator PFD by way of an input TS and the receiver clock is supplied from the receiver E to an input TE. An output A' of the phase/frequency discriminator PFD is "0" when the transmission clock and the receiver clock at both inputs TS and TE exactly coincide both in terms of frequency and phase. The clocks at the inputs TS and TE of the phase-frequency discriminator PFD can exactly coincide in frequency only when the transmission clock applied to the input TS and the receiver clock applied to the input TE belong to the same subscriber, i.e. when the receiver clock applied to the input TE derives from the data output by its own transmitter, these data having been clocked with the transmission clock applied to the input TS (the clock frequencies of the individual subscribers differ slightly from one another since the clock generators of the various subscribers are not coupled to one another).

When these two clocks at the inputs TS and TE, which can differ in phase due to the transit time via the optical connection and circuit elements, are compensated to "0" with the assistance of a delay element VL1 so that they are exactly equiphase, then the output A' of the phase-frequency discriminator PFD always becomes "0" when the signals of its own transmitter S are received.

This logical "0" is also forwarded as a logical "0" via an AND gate UG when the output Q1 of a monostable multivibrator MF1 switches to a logical "1" due to the receiver clock arriving at its terminal e1. Since the output B' of the AND gate UG carries a logical "0", the output Qz of a monostable multivibrator MF2 having an input e2 connected to the output B' of the AND gate UG and the output Q3 of a third monostable multivibrator MF3 having its input e3 connected to the output Qz of the second monostable multivibrator MF2 remain at a logical "0".

The logical "0" at the output Q3 of the third multivibrator MF3 signals that the bus is occupied with intrinsic data. The logical "0" at the output Q3 of the third monostable multivibrator MF3 also appears when the bus is not occupied at all since, in this case, although the transmission clock appears at the output A' of the phase/frequency discriminator PFD, the output B' of the AND gate UG remains at a logical "0" and because the output Q1 of the first monostable multivibrator MF1 remains at a logical "0" due to the lack of a receiver clock from the receiver E. Upon reception of a signal in the receiver E that does not stem from its own transmitter S, but from a different transmitter, after decoding both the clock frequency of the receiver clock from the receiver E and the phase thereof differing from the clock frequency and the phase of the transmission clock of its own transmitter S applied to the input TS of the phase/frequency discriminator PFD. Consequently appearing at the output A' of the phase/frequency discriminator PFD is a pulse sequence whose pulse length is a function of the frequency difference and phase difference of the clocks applied to the inputs TS and TE of the phase/frequency discriminator PFD.

Since, given the presence of a receiver clock at the input TE and, therefore, at its input e1 as well, the output Q1 of the first monostable multivibrator MF1 switches to a logical "1", the pulse signal at the output A' of the phase/frequency discriminator PFD is transmitted up to the output B' of the AND gate UG. The logical "1" at the output B' of the AND gate UG is forwarded via a second monostable multivibrator MF2 and the third monostable multivibrator MF3. The logical "1" at the output Q3 of the third monostable multivibrator MF3 means that the bus is occupied by another subscriber.

Since every subscriber at the optical star bus likewise has the bus state recognition circuit which has been described above, this logical "1" arises at every subscriber except the transmitting subscriber. As has already been described, the output Q3 of the third monostable multivibrator MF3 carries a logical "0". In this manner, all subscribers are informed that the optical star bus is occupied.

At the same time, circuit-oriented measures can prevent another transmitter from switching on for the time of the occupation of the bus. To this end, the output Q3 of the third monostable multivibrator MF3 is supplied by way of an inverter IG to an input e71 of a NAND gate NG at whose second input e72 the valid signal to be supplied to the Manchester encoder MK of its own transmitter S is transmitted. The transmission of data from the Manchester encoder MK to the light-emitting diode driver LT is then only possible when the output Q3 carries a logical "0" and a valid signal is sent.

Due to the transit time of the data from a transmitter to a receiver (a few μs), it can occur that a plurality of subscribers wish to occupy the bus simultaneously. The collision is recognized in each bus state recognition circuit of the various subscribers in the manner described above and is indicated by a logical "1" at the output Q3 of the third monostable multivibrator MF3 at all subscribers.

The manner of operation of the bus state recognition circuit of FIG. 5 can be characterized by the following truth table for the bus state.

monostable multivibrator MF3 are registered as transmission errors via an error line. The time constant of the third monostable multivibrator is advantageously selected to be equal to a whole multiple of the pulse and clock duration T.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In an optical data bus system, particularly having a statistical access method, for transmitting data over an optical data bus between transmitters and receivers in the form of clocked signals, particularly non-return to Zero (NRZ) data, and which each transmitter has assigned thereto an encoder for encoding signals, including the clock, to be output onto the data bus and each receiver has assigned thereto a decoder for decoding signals received from the data bus and for reacquisition of the clock contained in the encoded data, the improvement wherein:

each of said encoders comprises a Manchester en-

| TS | TE | $\Delta\phi$ | $\Delta f_T$ | A' | Q1 | B' | Q2 | Q3 | BUS STATE |
|---|---|---|---|---|---|---|---|---|---|
| Transmit Clock | Receiver Clock for own Transmitter | 0 | 0 | 0 | 1 | 0 | 0 | 0 | Bus free (own occupation) |
| Transmit Clock | 0 | — | Transmit Clock | Transmit Clock | 0 | 0 | 0 | 0 | Bus fee |
| Transmit Clock | Receiver Clock from Different Transmitter | 0 | Transmit Clock Minus Receiver Clock of Different Transmitter | ⎍⎍ | 1 | ⎍⎍ | 1 | 1 | Bus occupied/ collision |

$\Delta\phi$ = phase difference
$\Delta f_T$ = clock frequency difference

The monostable multivibrator MF in FIG. 3 and the two monostable multivibrators MF1 and MF2 are advantageously formed, respectively, by an EXOR gate E5 and a monoflop MP having a time constant $T = RC = 1/f_T$ which is connected between the input e, e1 or e2 of the appertaining monostable multivibrator. The output of the EXOR gate E5 of each multivibrator MF, MF1 and MF2 forms the output b, Q1 and Qz of the appertaining multivibrator. The monoflop MP of each of these monostable multivibrators MF, MF1 and MF2 effects a phase shift of the clock applied to the input e, e1 or e2 of the respective multivibrator such that the two inputs e51, e52 of the EXOR gate E5 always lies at different logic levels as long at the supplied clock signals last.

Since the monoflops MP of the monostable multivibrators MF1 and MF2 in FIG. 5 have a time constant of $T = RC = 1/f_T$, every clock alteration which can arise due to the transmission errors has the effect of a collision. Since, however, evey bit error or every bit outage need not yet mean a collision or free bus, the time constant in the third monostable multivibrator MF3 is set such that only errors that last over a plurality of bits are recognized as collisions. The errors that only have a duration shorter than the time constant of the third coder for Manchester encoding the clocked signals;

each of said decoders comprises a Manchester decoder for decoding the received signals, and a clock recovering means operable to reaquire the clock in response to the Manchester-encoded data and the decoded data;

said Manchester decoder comprising first, second and third delay lines connected to receive the Manchester-encoded data and delay the same respectively by half the clocked ration, by a duration line between half the clocked duration and the full clocked duration, and by the full clocked duration of the clock contained in the supply data;

first, second and third EXCLUSIVE OR gates;

first and second D flip-flops, each including a D input, a clock input, a clear input, a Q output and a $\overline{Q}$ output;

said second delay line and said third delay line connected to said third EXCLUSIVE OR gate and said third EXCLUSIVE OR gate connected to the clock input of said first D flip-flop;

said Manchester-encoded data and said first delay line connected to said first EXCLUSIVE OR gate, and said first EXCLUSIVE OR gate connected to said second EXCLUSIVE OR gate, connected to operate as an inverter, said second EXCLUSIVE OR gate connected to said D input of said first D flip-flop;

said clock input of said second D flip-flop connected to said Q output of said first D flip-flop and the undelayed Manchester-encoded data connected to said D input of said second D flip-flop, said $\overline{Q}$ output of said second D flip-flop providing the required NRZ data;

said output of said first EXCLUSIVE OR gate connected, via said second EXCLUSIVE OR gate to the clear input of said first D flip-flop;

said first and second D flip-flops each comprising a presetting input and said presetting inputs and said clear input of said second D flip-flop being connected to a high, constant voltage level for presetting; and said system further comprising a delay element connected to said $\overline{Q}$ output of said second D flip-flop and operable to effect a delay of the difference between the full clock duration and the delayed duration effected by said second delay line and including an output for providing the NRZ data in the phase of the clock with which the supply data are clocked.

2. The improved data bus system of claim 1, wherein:
said clock recovery means comprises a fourth EXCLUSIVE OR gate connected to and combining the outputs of said delay element and said first delay line which provides the Manchester encoded data delayed by half the clock duration to produce the clock contained in the supply data.

3. The improved data bus system of claim 2, and further comprising:
a monostable multivibrator including an input connected to said fourth EXCLUSIVE OR gate and an output which changes from one state to another with the beginning of a clock supplied by said fourth EXCLUSIVE OR gate and changes back into the one state at the end of the supply clock.

4. In an optical data bus system, particularly having a statistical access method, for transmitting data over an optical data bus between transmitters and receivers in the form of clocked signals, particularly non-return to Lero (NRZ) data, in which each transmitter has assigned thereto an encoder for encoding signals, including the clocked output onto the data bus and each receiver has assigned thereto a decoder for decoding signals received from the data bus and for reacquisition of the clock contained in the encoded data, the improvement wherein:
each of said encoders comprises a Manchester encoder for Manchester encoding the clocked signal;
each of said decoders comprises a Manchester decoder for decoding the received signals, and a clock recovering means operable to reaquire the clock in response to the Manchester-encoded data, and the decoded data;
a phase/frequency discriminator is provided for each pair of mutually-assigned transmitters and receivers, said phase/frequency discriminator including a first input for receiving the transmission clock with which the data transmitted by the assigned transmitter are clocked and a second input for receiving the receiver clock reacquired by the clock recovery means of the assigned receiver;

a delay element is provided and is connected between said clock recovery means and said second input of said phase/frequency discriminator to delay the recovered clock such that its phase coincides with the phase of the transmission clock when the clock recovery means reacquires its own transmission clock from the encoded data received from the assigned transmitter, said phase/frequency discriminator including an output for providing an output signal which is zero when the transmission and receiver clocks coincide in frequency and in phase, said phase/frequency discriminator providing a pulse length is a function of the frequency difference and the phase difference between the transmission clock and the receiver clock;

a first monostable multivibrator including an input connected to said delay element for receiving the delayed receiver clock and an output providing an output signal which changes from a logical "0" to a logical "1" with the beginning of a supply receiver clock and changes back to logical "0" at the end of the receiver clock;

an AND gate including a first input connected to said output of said first monostable multivibrator and the second input connected to said output of said phase/frequency discriminator, and an output;

a second monostable multivibrator including an input connected to said output of said AND gate and an output, said second monostable multivibrator operable to provide an output signal at said output which changes from a logical "0" to a logical "1" with the beginning of a supply pulse sequence from said AND gate and which changes back into a logical "0" at the end of the pulse sequence and which indicates bus state recognition;

a leading edge controlled third monostable multivibrator including an input connected to said output of said second monostable multivibrator, and an output, said third monostable multivibrator having a fixed time constant equal to at least one clock length of said transmission clock and operable to provide an output signal at said output as a bus state recognition signal;

each of said monostable multivibrators comprising a monoflop including an input and an output and having a fixed time constant selected such that, during the pulse sequence, levels always differing from one another are present at said output of said monoflop, and an EXCLUSIVE OR gate including a first input directly connected to said input of the respective monostable multivibrator and a second input connected to said output of the respective monoflop; and said output of said EXCLUSIVE OR gate of said first monostable multivibrator connected to said AND gate, said output of said EXCLUSIVE OR gate of said second monostable multivibrator connected to said input of said third monostable multivibrator, and said output of said EXCLUSIVE OR gate of said third monostable multivibrator providing the bus state recognition signal.

5. The improved data bus system of claim 4, wherein:
means for using the output signal of said second monostable multivibrator is simultaneously used as an error recognition signal which indicates an error when such signal is shorter than the time constant of said third monostable multivibrator.

6. The improved data bus system of claim 4, and further comprising:
  an inverter connected to said output of said third monostable multivibrator; and
  a NAND gate including a first input connected to said inverter, a second input connected to receive a valid signal and an output connected to the assigned Manchester encoder of the assigned transmitter for providing a valid signal thereto.

* * * * *